(12) United States Patent
Karuppiah

(10) Patent No.: US 11,343,174 B2
(45) Date of Patent: May 24, 2022

(54) NETWORKING AGGREGATION SYNCHRONIZATION SYSTEM

(71) Applicant: Dell Products L.P., Round Rock, TX (US)

(72) Inventor: Kannan Karuppiah, Freemong, CA (US)

(73) Assignee: Dell Products L.P., Round Rock, TX (US)

( * ) Notice: Subject to any disclaimer, the term of this patent is extended or adjusted under 35 U.S.C. 154(b) by 95 days.

(21) Appl. No.: 15/929,858

(22) Filed: May 26, 2020

(65) Prior Publication Data

US 2021/0377159 A1 Dec. 2, 2021

(51) Int. Cl.
| | |
|---|---|
| *H04L 12/24* | (2006.01) |
| *H04L 12/26* | (2006.01) |
| *H04L 12/751* | (2013.01) |
| *H04L 45/24* | (2022.01) |
| *G06F 16/27* | (2019.01) |
| *H04L 61/103* | (2022.01) |
| *H04W 56/00* | (2009.01) |
| *H04L 101/622* | (2022.01) |
| *G06Q 10/10* | (2012.01) |

(52) U.S. Cl.
CPC ............ *H04L 45/245* (2013.01); *G06F 16/27* (2019.01); *H04L 61/103* (2013.01); *H04W 56/001* (2013.01); *G06Q 10/10* (2013.01); *H04L 61/6022* (2013.01)

(58) Field of Classification Search
CPC ... H04L 45/245; H04L 43/0811; H04L 41/12; H04L 41/0677; H04L 49/3009; H04L 45/02; H04L 61/103; H04L 61/6022; H04L 49/552; H04L 43/10; H04L 43/08; H04W 56/001; G06F 16/27; G06Q 10/10
USPC .......................................................... 370/350
See application file for complete search history.

(56) References Cited

U.S. PATENT DOCUMENTS

| | | | |
|---|---|---|---|
| 6,910,149 B2 * | 6/2005 | Perloff ...................... H04L 1/22 | 714/4.3 |
| 9,590,893 B2 * | 3/2017 | Janardhanan ......... H04L 45/245 | |
| 2010/0020680 A1 * | 1/2010 | Salam ................. H04L 43/0811 | 370/225 |

(Continued)

*Primary Examiner* — Edan Orgad
*Assistant Examiner* — Vanneilian Lalchinthang
(74) *Attorney, Agent, or Firm* — Joseph Mencher

(57) ABSTRACT

A system includes a first aggregated networking device that is coupled to a second aggregated networking device via an inter-aggregated-networking-device link and that is configured to provide a first portion of a link aggregation to a connected device, The first aggregated networking device receives a first packet via a first aggregated port that is included in the first aggregated networking device and that provides the first portion of the link aggregation to the connected device. The first packet includes first information for synchronizing at least one process running in the first aggregated networking device with respective corresponding processes running in the second aggregated networking device. The first aggregated networking device copies, using a first network processing system, the first packet to provide a first copied packet and provides, using the first network processing system, the first copied packet to the second aggregated networking device via the inter-aggregated-networking-device link.

20 Claims, 11 Drawing Sheets

(56) References Cited

U.S. PATENT DOCUMENTS

| | | | |
|---|---|---|---|
| 2014/0056122 A1* | 2/2014 | Singal | H04L 45/28 370/220 |
| 2014/0241374 A1* | 8/2014 | Krishnamurthy | H04L 49/552 370/401 |
| 2016/0112549 A1* | 4/2016 | Zhou | H04L 45/24 370/216 |
| 2016/0212041 A1* | 7/2016 | Krishnamurthy | H04L 12/4641 |
| 2017/0272357 A1* | 9/2017 | Moopath Velayudhan | H04L 45/16 |
| 2018/0331855 A1* | 11/2018 | Subramanian | H04L 12/462 |
| 2020/0120013 A1* | 4/2020 | Goud Gadela | H04L 45/24 |

* cited by examiner

NETWORKING AGGREGATION SYNCHRONIZATION SYSTEM

BACKGROUND

The present disclosure relates generally to information handling systems, and more particularly to synchronizing aggregated networking information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and/or other networking devices known in the art, are sometimes provided in networking aggregation systems. For example, multiple networking devices may provide a networking aggregation system via the utilization of the Virtual Link Trunking (VLT) protocol, which one of skill in the art in possession of the present disclosure will recognize is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP), as well as including other VLT functionality known in the art. As such, in specific examples involving the VLT protocol, the networking aggregation system may include a VLT domain provided by the networking devices that are referred to as VLT peer devices, with each of those VLT peer devices connected together via a plurality of inter-networking-device/inter-VLT-peer-device links that may be aggregated into a Link Aggregation Group (LAG) that is referred to as an Inter-Chassis Link (ICL) or VLT interconnect (VLTi). Furthermore, each of the VLT peer devices may be connected to a Top Of Rack (TOR) switch device via respective links that may be aggregated to provide a LAG that is referred to as a VLT LAG, with that VLT LAG provided by VLT ports that are included on the VLT peer devices and provided as part of a VLT port channel, and with that TOR switch device coupled to one or more host devices. Finally, the VLT peer devices may be connected to one or more core switch devices that provide access to other devices via a network.

Networking aggregation systems sometime require synchronization. For example, networking aggregation systems often elect one of the VLT peer devices as a primary VLT peer device, with the other VLT peer device being designated as a secondary VLT peer device, and various processes running in the primary VLT peer device and the secondary VLT peer device need to complete synchronization operations so that each operates correctly in providing the VLT LAG with the TOR switch device. Such synchronization may be required for elements of the VLT domain including, for example, a number of Virtual Local Area Networks (VLANs), Media Access Control (MAC) addresses, Layer 2 (L3) routes (e.g., Address Resolution Protocol (ARP) learns), Internet Group Management Protocol (IGMP) snooping routes, multicast routes, and/or other characteristics of the VLT domain that may require synchronization.

In conventional systems, the synchronization operations are performed by various protocol manager applications provided in the application level that are processed by a central processing system in a VLT peer device, and the results of the synchronization operations are then shared with a corresponding protocol manager application in the central processing system of the other VLT peer device via the ICL to complete the synchronization. For example, when maintaining symmetric MAC tables between VLT peer devices, a MAC-synchronization mechanism may be used such that a MAC learn that happens on any of the VLT ports in a first VLT peer device is synchronized with a second VLT peer device using a control plane MAC manager on the second VLT peer devices that install the MAC entry as though it was learnt on its own VLT port. Similarly, when the TOR switch device acts as an L3 router, all the ARP learns on the VLT VLANs are synchronized to between the VLT peer devices by ARP managers.

Some of the control protocols elements such as, for example, spanning-tree packets and IGMP protocol packets, should be processed first by the primary VLT peer device, as if the secondary VLT peer device receives these control protocols via a VLT port channel then the secondary VLT peer device will process the packets with respective protocol manager applications at its central processing system. For example, if the secondary VLT peer device receives the control packets first, the protocol manager application(s) in the secondary VLT peer device will check the VLT port channel and the role of the VLT peer device as a secondary VLT peer device and send, for example, BPDU packets to the primary VLT peer device. Such learning and processing of these packets by the secondary VLT peer device at the application level in the manner described above adds to the application workload and processing at the central processing system of the secondary VLT peer device.

Accordingly, it would be desirable to provide networking aggregation synchronization system that addresses the issues discussed above.

SUMMARY

According to one embodiment, an Information Handling System (IHS) includes a central processing system; a network processing system; and a memory system that is coupled to the network processing system and the central processing system and that includes instructions that, when executed by the network processing system, cause the network processing system to provide a network synchronization engine that is configured to: receive a first packet on a first aggregated port that provides a first portion of a link aggregation to a connected device, wherein the first packet includes first information for synchronizing at least one first aggregated networking device process running in at least one of the central processing system or the network processing system with respective corresponding second aggregated networking device processes running in a first aggregated networking device that is coupled to the network processing system via an inter-aggregated-networking-device link; copy the first packet to provide a first copied packet; and provide the first copied packet to the first aggregated networking device via the inter-aggregated-networking-device link without processing the first copied packet using the central processing system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
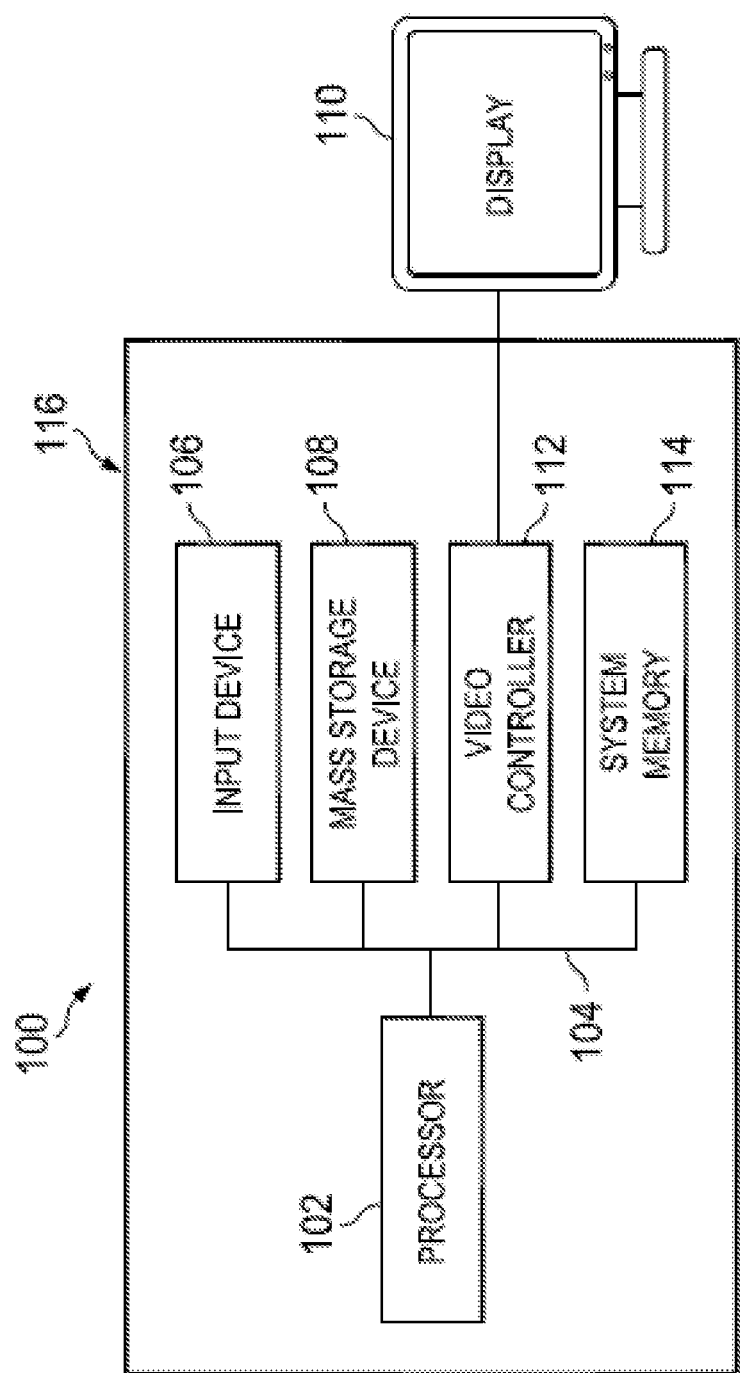
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
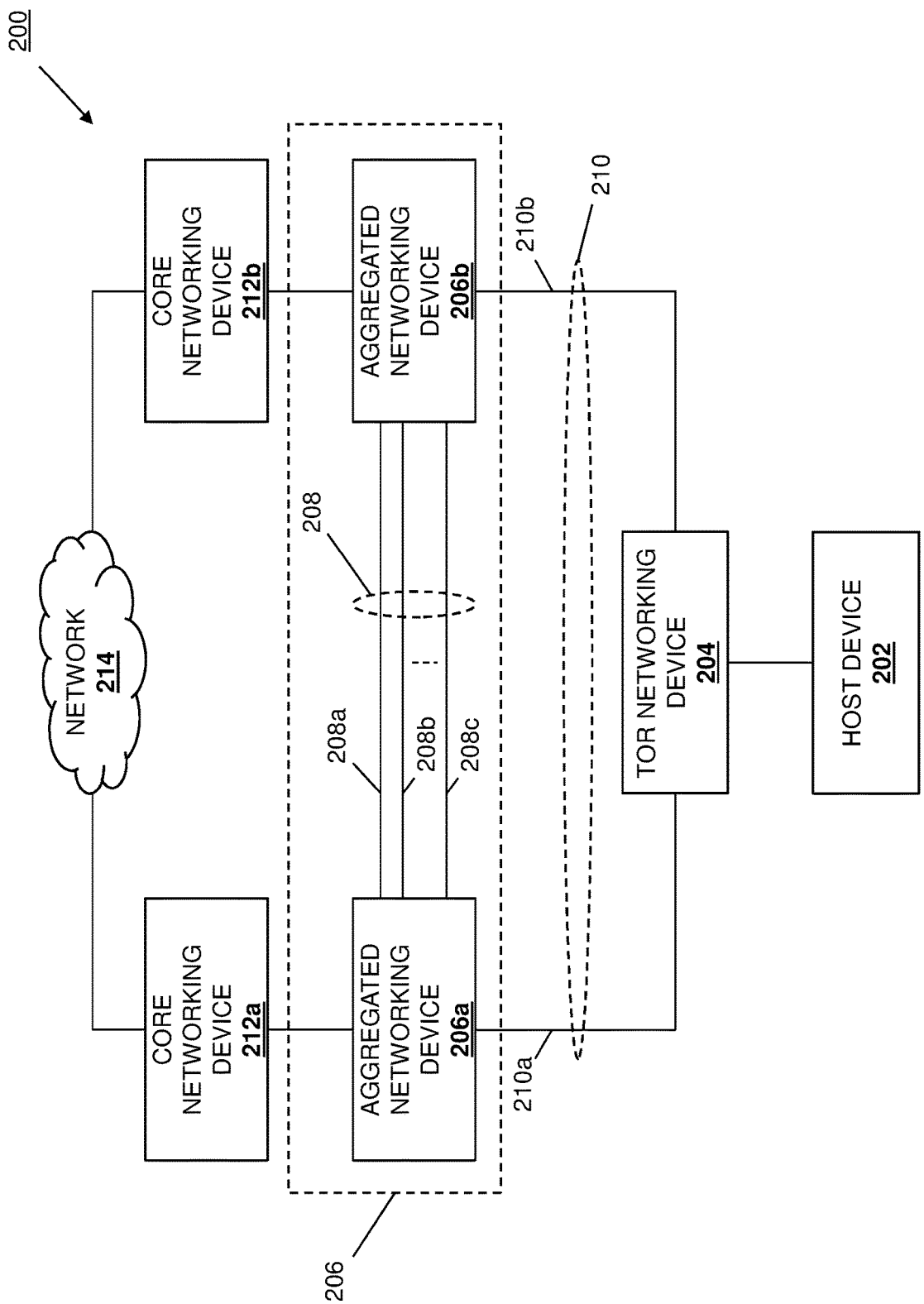
FIG. 2 is a schematic view illustrating an embodiment of a networking aggregation synchronization system.

Referring now to FIG. 2, an embodiment of a networking aggregation synchronization system 200 is illustrated. In the illustrated embodiment, the networking aggregation synchronization system 200 incudes a host device 202. In an embodiment, the host device 202 may be provided by the IHS 100 discussed above with reference to FIG. 1, and/or may include some or all of the components of the IHS 100, and in specific examples may be provided by a server device included in a rack. However, while illustrated and discussed as a single server device included in a rack, one of skill in the art in possession of the present disclosure will recognize that host devices provided in the networking aggregation synchronization system 200 may include any devices that may be configured to operate similarly as the host device 202 discussed below, and that more than one host device may be provided while remaining within the scope of the present disclosure as well.

In the illustrated embodiment, the networking aggregation synchronization system 200 also incudes a Top of Rack (TOR) networking device 204 that is coupled to the host device 202. In an embodiment, the TOR networking device 204 may be provided by the IHS 100 discussed above with reference to FIG. 1, and/or may include some or all of the components of the IHS 100, and in specific examples may be provided by a TOR switch device that is included in a rack that also houses a plurality of server devices (e.g., including a server device providing the host device 202.) However, while illustrated and discussed as a TOR switch device included in a rack, one of skill in the art in possession of the present disclosure will recognize that other devices provided in the networking aggregation synchronization system 200 may include any devices that may be configured to operate similarly as the TOR networking device 204 discussed below while falling within the scope of the present disclosure as well.

In the illustrated embodiment, the networking aggregation synchronization system 200 includes an aggregated networking device domain 206 that is provided by a pair of aggregated networking devices 206a and 206b that are coupled together by a plurality of inter-networking-device links 208a, 208b, and up to 208c that have been aggregated into an Inter-Chassis Link (ICL) 208. In the illustrated embodiment, the aggregated networking device 206a is coupled to the TOR networking device 204 by at least one link 210a, and the aggregated networking device 206b is coupled to the TOR networking device 204 by at least one link 210b, with the links 210a and 210b having been aggregated into a Link Aggregation Group (LAG) 210 between the TOR networking device 204 and the aggregated networking device domain 206. In an embodiment, either or both of the aggregated networking devices 206a and 206b may be provided by the IHS 100 discussed above with reference to FIG. 1, and/or may include some or all of the components of the IHS 100. For example, the aggregated networking devices 206a and 206b may be provided by a variety of aggregated switch devices that would be apparent to one of skill in the art in possession of the present disclosure.

In a specific example, the networking aggregation synchronization system 200 may utilize the Virtual Link Trunking (VLT) protocol, which as discussed above is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP), as well as including other VLT functionality known in the art. As such, with reference to FIG. 2, the aggregated networking device domain 206 may provide a VLT domain, with the aggregated networking devices 206a and 206b provided by VLT peer devices that are coupled together via the ICL 208 provided by a VLT interconnect (VLTi), and with the LAG 210 provided by a VLT LAG that couples the VLT peer devices to the TOR networking device 204. In the examples provided below, the aggregated networking device 206a is described as operating as a primary VLT peer device, and the aggregated networking device 206b is described as operating as a secondary VLT peer device, with the aggregated networking device 206a/primary VLT peer device performing much of the functionality of method 400 discussed below. However, one of skill in the art in possession of the present disclosure will appreciate that the aggregated networking device 206b/secondary VLT peer device may perform the functionality described below for the aggregated networking device 206a/primary VLT peer device while remaining within the scope of the present disclosure as well.

In the illustrated embodiment, the networking aggregation synchronization system 200 includes a pair of core networking devices 212a and 212b, with the core networking device 212a coupled to the aggregated networking device 206a, and the core networking device 212b coupled to the aggregated networking device 206b. In an embodiment, either or both of the core networking devices 212a and 212b may be provided by the IHS 100 discussed above with reference to FIG. 1, and/or may include some or all of the components of the IHS 100. For example, the core networking devices 212a and 212b may be provided by a variety of core switch devices that would be apparent to one of skill in the art in possession of the present disclosure. Furthermore, while a pair of core networking devices 212a and 212b are illustrated, one of skill in the art in possession of the present disclosure will recognize that a single core networking device may be provided in the networking aggregation synchronization system 200 and coupled to both of the aggregated networking devices 206a and 206b while remaining within the scope of the present disclosure as well. While a specific networking aggregation synchronization system 200 has been illustrated and described, one of skill in the art in possession of the present disclosure will recognize that the networking aggregation synchronization system of the present disclosure may include a variety of components and component configurations while remaining within the scope of the present disclosure as well.

Figure 3:
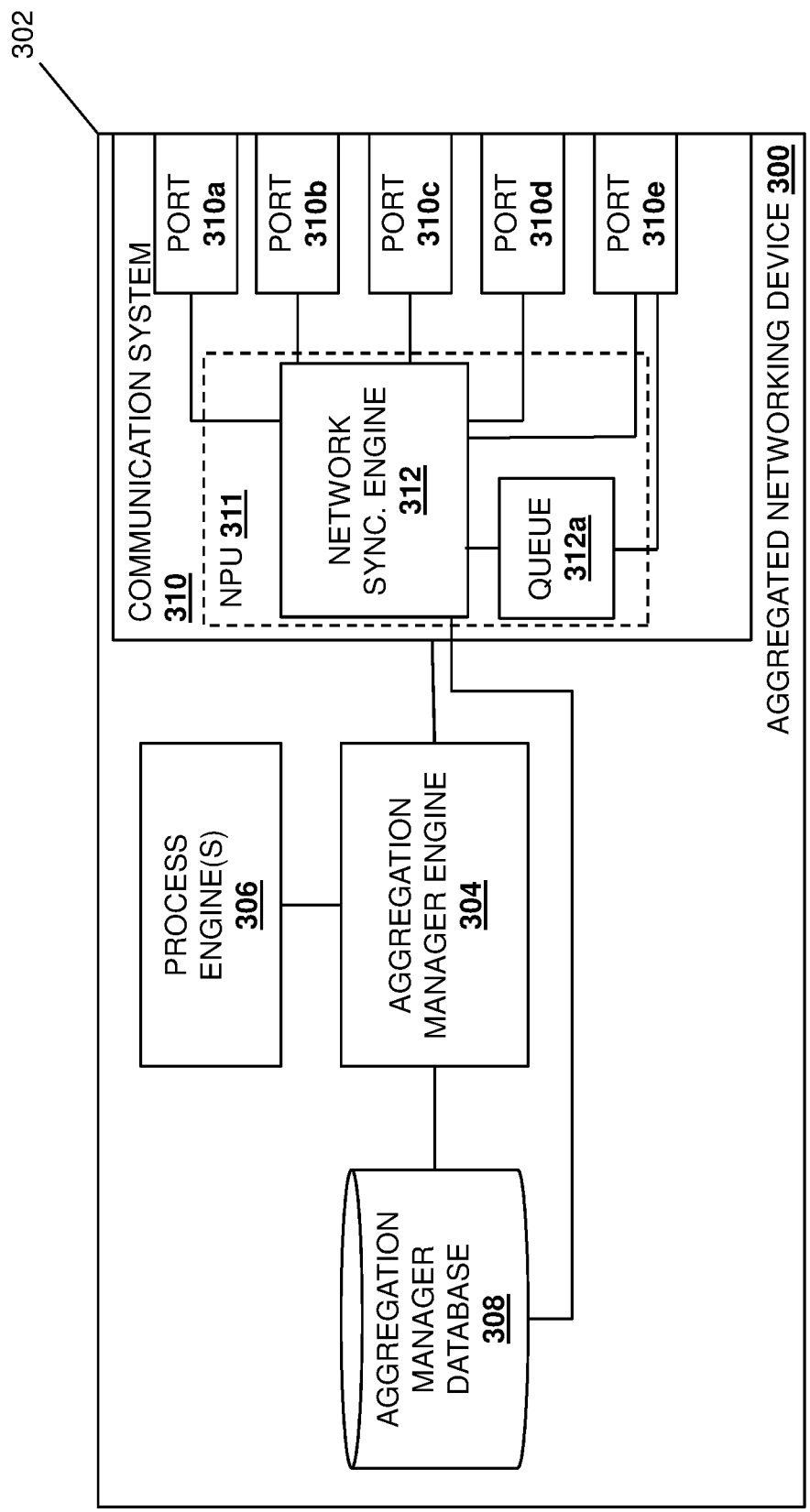
FIG. 3 is a schematic view illustrating an embodiment of an aggregated networking device that may be provided in the networking aggregation synchronization system of FIG. 2.

Referring now to FIG. 3, an embodiment of an aggregated networking device 300 is illustrated that may provide either or each of the aggregated networking devices 206a and 206b discussed above with reference to FIG. 2. As such, the aggregated networking device 300 may be provided by the IHS 100 discussed above with reference to FIG. 1 and/or may include some or all of the components of the IHS 100. Furthermore, while illustrated and discussed as an aggregated switch device, one of skill in the art in possession of the present disclosure will recognize that the functionality of the aggregated networking device 300 discussed below may be provided by other devices that are configured to operate similarly as the aggregated networking device 300 discussed below. In the illustrated embodiment, the aggregated networking device 300 includes a chassis 302 that houses the components of the aggregated networking device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an aggregation manager engine 304 that is configured to perform the functionality of the aggregation manager engines and/or aggregated networking devices discussed below. In the example, the processing system that provides the aggregation manager engine 304 may include a central processing system (e.g., a CPU).

In addition, the memory system that is housed in the chassis 302 and coupled to the processing system may include instructions that, when executed by the processing system, cause the processing system to provide one or more process engine(s) 306 that are configured to perform the functionality of the process engines and/or aggregated networking devices discussed below. In different embodiments, and as discussed in more detail in some of the examples provided below, the process engine(s) 306 may include a Media Access Control (MAC) address manager engine that provides a MAC address manager process, an Address Resolution Protocol (ARP) manager engine that provides an ARP manager process, a multicast routing protocol engine that provides a multicast routing protocol process, an aggregation Spanning Tree Protocol (xSTP) engine that provides an aggregation xSTP process, an Internet Group Management Protocol (IGMP) snooping engine that provides an IGMP snooping process, a Dynamic Host Configuration Protocol (DHCP) snooping engine that provides a DHCP snooping process, and/or other aggregated networking device processes that would be apparent to one of skill in the art in possession of the present disclosure. In the example, the processing system that provides the process engine(s) 306 may include the central processing system.

The chassis 302 may also house a storage system (not illustrated, but which may include the storage 108 discussed above with reference to FIG. 1) that is coupled to the aggregation manager engine 304 (e.g., via a coupling between the storage system and the processing system) and that includes an aggregation manager database 308 that is configured to store any of the information (e.g., MAC tables, ARP learns, and/or other information for synchronization that would be apparent to one of skill in the art in possession of the present disclosure) utilized by the aggregation manager engine 304 discussed below.

The chassis 302 may also house a communication system 310 that is coupled to the aggregation manager engine 304 (e.g., via a coupling between the communication system 310 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, one of skill in the art in possession of the present disclosure will appreciate that the communication system 310 may include ports that may be utilized to provide any of the links discussed above between the aggregated networking devices 206a/206b and the TOR networking device 204 and core networking devices 212a and 212b. To provide a specific example, the port 310a may be coupled to one of the core networking devices 212a and 212b, the port 310b may be coupled to the TOR networking device 204, the port 310c may be coupled to the inter-networking-device link 208a, the port 310d may be coupled to the inter-networking-device link 208b, and the port 310e may be coupled to the inter-networking-device link 208c.

In the illustrated example, the communication system 310 may include or is coupled to a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a network synchronization engine 312 that is configured to perform the functionality of the network synchronization engines and/or aggregated networking devices discussed below. As will be appreciated by one of skill in the art in possession of the present disclosure, the processing system that provides the network synchronization engine 312 may be provided by hardware that is separate and distinct from the hardware that is included in the processing system that provides the aggregation manager engine 304.

In the illustrated example, the processing system that provides the network synchronization engine 312 may include a Network Processing Unit (NPU) 311 such as, for example, an NPU provided by BROADCOM® Inc. of San Jose, Calif., United States. As such, the NPU 311 (or some other processing system included in the aggregated networking device 300 other than the processing system that provides the process engines 306 and the aggregation manager engine 304) may include or be coupled to a memory system (not illustrated, but which may include the memory 114 discussed above with reference to FIG. 1) that includes instructions that when executed by the NPU 311, causes the NPU 311 to provide a packet processing engine (not illustrated) that is configured to perform the functionality of the conventional packet processing engines, conventional NPUs, and conventional networking devices. In a specific example, the aggregation manager engine 304 and process engines 306 may be provided, at least in part, by a Central Processing Unit (CPU) in the aggregated networking device 300 that is separate and distinct from the NPU 311 in the aggregated networking device 300 that performs conventional switch device functions (e.g., data path determination and data path forwarding), and that may be included in instructions on the memory system that, when executed by the CPU, cause the CPU to provide a DELL® Operating System 10 (OS10) available from DELL® Inc., of Round Rock, Tex., United States, configures the NPU 311 to perform the switch device functions, and/or performs a variety of other CPU functionality known in the art.

In the illustrated embodiment, the NPU 311 may include or be coupled to a storage system (not illustrated, but which may include the storage device 108 discussed above with reference to FIG. 1) that includes the aggregation manager database 308 which may include packet processing table(s) that are configured to store any of the information utilized by the packet processing engines, NPUs, and networking devices discussed below. In a specific example, the packet processing table(s) may be provided by hardware table(s) included in the NPU 311, although other storage devices/techniques are envisioned as falling within the scope of the present disclosure as well. In the illustrated embodiment, the network synchronization engine 312 may be coupled to the plurality of ports 310a, 310b, 310c, 310d and up to 310e, each of which are coupled to the packet processing engine (e.g., via a bus or other coupling to the NPU 311.) As will be appreciated by one of skill in the art in possession of the present disclosure, the ports 310a-310e illustrated in FIG. 3 may each include an ingress port and an egress port.

In the illustrated embodiment, the network synchronization engine 312 in the NPU 311 is configured to provide one or more queues (e.g., egress queues) for the ports 310a-e. For example, in the illustrated embodiment, one or more queues 312a are provided for the port 310e. However, while one queue (e.g., queue 312a) is illustrated, one of skill in the art in possession of the present disclosure will recognize that queue(s) may be provided for one or more of the ports 310a-310d, as well. In some of the specific examples discussed below, each of the ports 310a-310e are provided eight queues, although the provisioning of any number of queues for each of the ports 310a-310e is envisioned as falling within the scope of the present disclosure as well. While a specific aggregated networking device 300 has been illustrated, one of skill in the art in possession of the present disclosure will recognize that aggregated networking devices (or other devices operating according to the teachings of the present disclosure in a manner similar to that described below for the aggregated networking device 300) may include a variety of components and/or component configurations for providing conventional aggregated networking device functionality, as well as the functionality discussed below, while remaining within the scope of the present disclosure as well.

Figure 4:
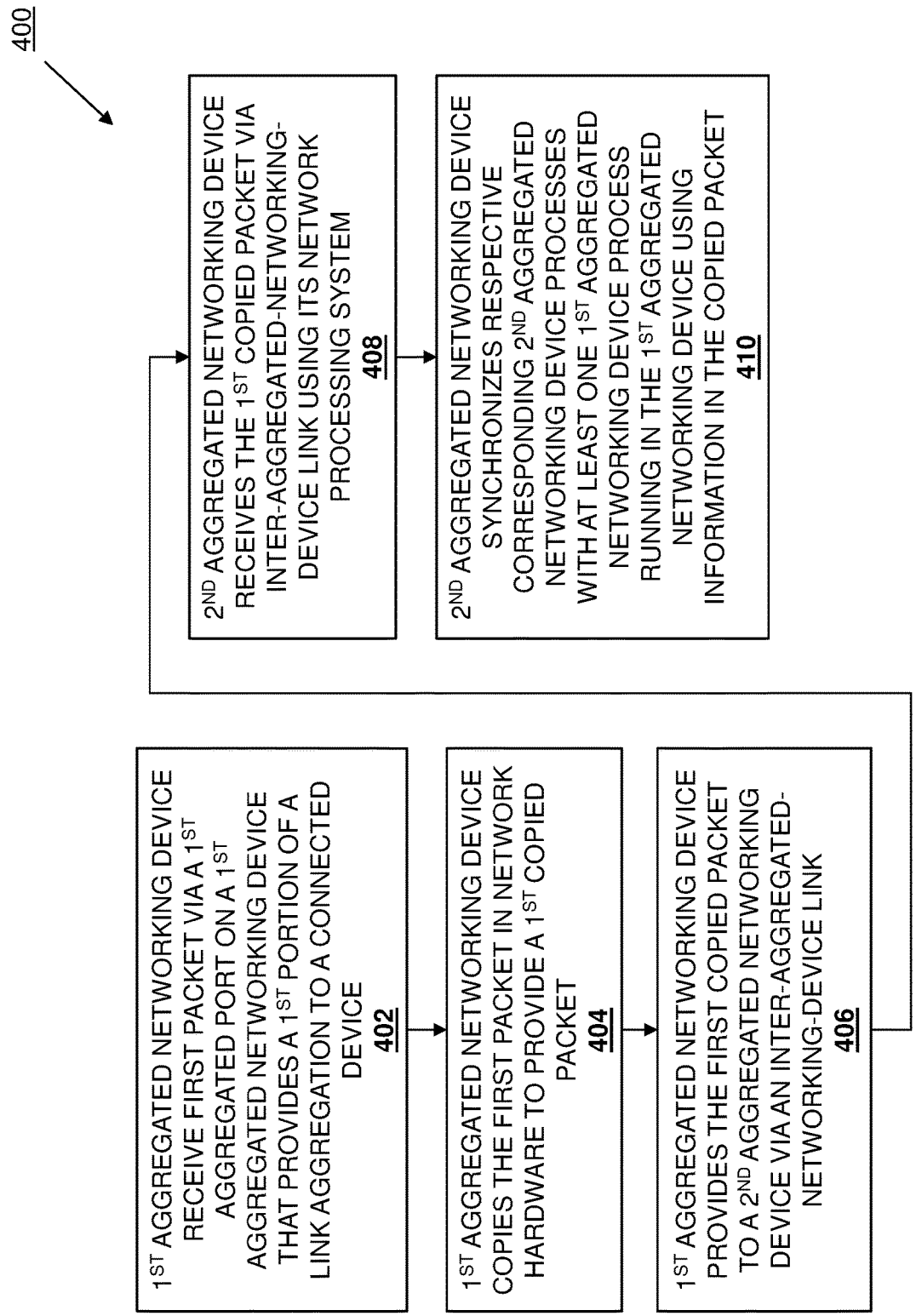
FIG. 4 is a flow chart illustrating an embodiment of a method for synchronizing aggregated networking devices in a networking aggregation system.

Referring now to FIG. 4, an embodiment of a method 400 for synchronizing aggregated networking devices in a networking aggregation system is illustrated. As discussed below, the systems and methods of the present disclosure provide for the synchronization of aggregated networking device processes running in aggregated networking devices that provide an aggregated networking device domain. For example, an aggregated networking device domain may include a first aggregated networking device that is configured to provide a first portion of a link aggregation to a connected device, and a second aggregated networking device that is coupled to the first aggregated networking device and that is configured to provide a second portion of the link aggregation to the connected device. The first aggregated networking device may establish an inter-aggregated-networking-device link with the second aggregated networking device. The first aggregated networking device may then receive a first packet via a first aggregated port that is included in the first aggregated networking device and that provides the first portion of the link aggregation to the connected device, and that first packet may include first information for synchronizing at least one first aggregated networking device process running in the first aggregated networking device with respective corresponding second aggregated networking device processes running in the second aggregated networking device. A network processing system included in the first aggregated networking device may then copy the packet to provide a copied packet, and provide the copied packet to the second aggregated networking device via the inter-aggregated-networking-device link.

The second aggregated networking device may receive the first copied packet via the inter-aggregated-networking-device link (e.g., a link of an ICL) using a second network processing system included in the second aggregated networking device, and then use a second central processing system included in the second aggregated networking device and the information included in the first copied packet to synchronize the respective corresponding second aggregated networking device processes with the at least one first aggregated networking device process running in the first aggregated networking device. As such, the first aggregated networking device may copy the packet in its network hardware (e.g., the first network processing system) without having to process the packet for synchronization at an application level with its first central processing system. As will be appreciated by one of skill in the art in possession of the present disclosure, bypassing the central processing system in the first aggregated networking device reduces the number of processes and workloads required from the aggregated networking device processes. Furthermore, providing a copied packet directly from network hardware without the use of central processing systems speeds up the synchronization process.

Figure 5A:
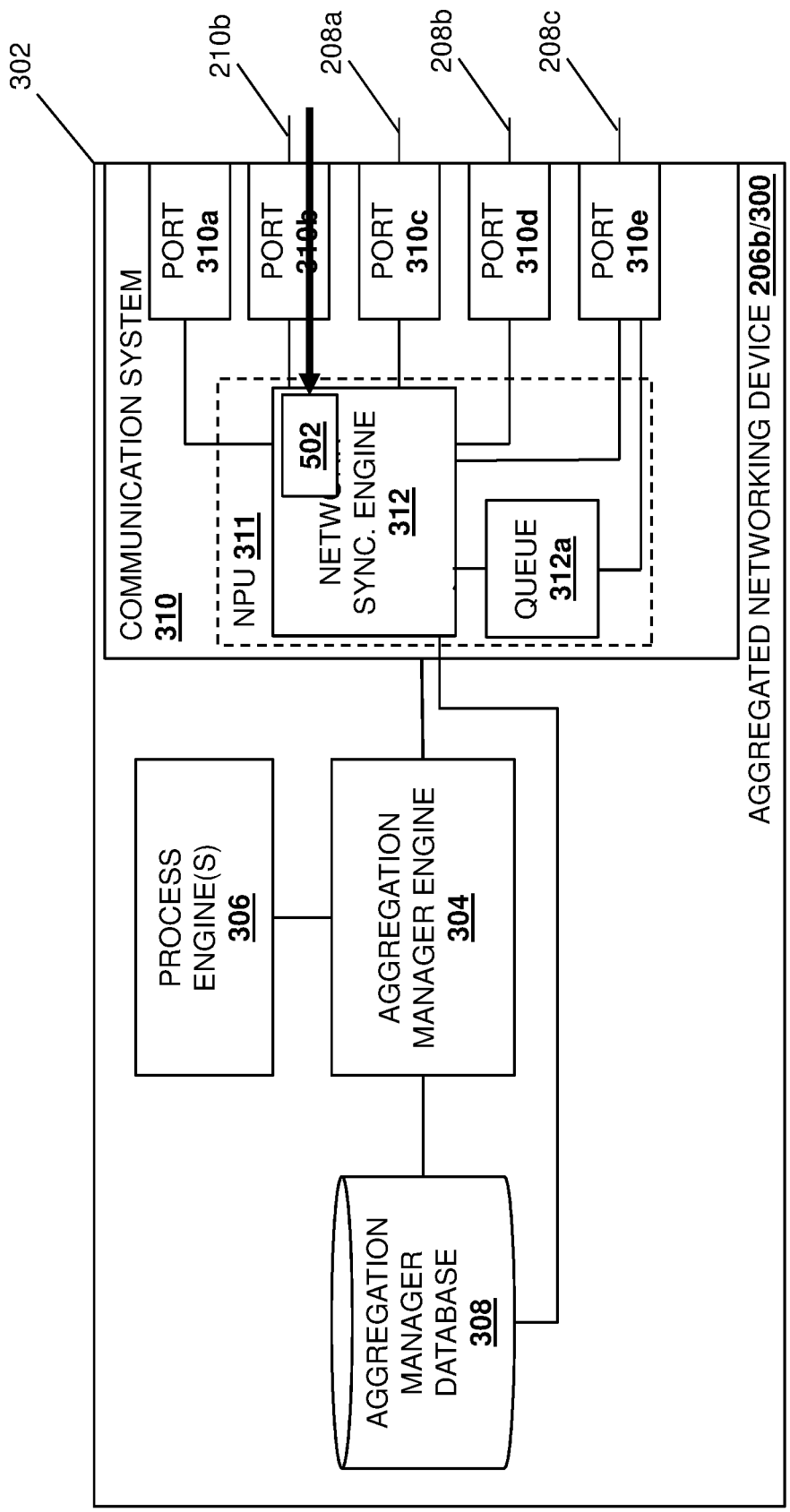
FIG. 5A is a schematic view illustrating an embodiment of the networking aggregation synchronization system of FIG. 2 operating during the method of FIG. 4.

The method 400 begins at block 402 where a first aggregated networking device receives a first packet via a first aggregated port that is included on a first aggregated networking device and that provides a first portion of a link aggregation to a connected device. With reference to the example illustrated in FIG. 5A, in an embodiment of block, the aggregated networking device 206b/300 may receive a packet 502 from the TOR networking device 204 via the port 310b that is coupled to the at least one link 210a that provides a portion of the LAG 210 between the TOR networking device 204 and the aggregated networking device domain 206. The packet 502 may include information for synchronizing at least one first aggregated networking device process provided by the process engine(s) 306 that run in the aggregated networking device 206b/300 with respective corresponding aggregated networking device processes provided by the process engine(s) 306 that run in the aggregated networking device 206a/300. For example, the packet 502 may include a MAC address of the TOR networking device 204 and/or the host device 202, ARP information, multicast routing information, STP port states, Internet Group Management Protocol (IGMP) snooping routes, and/or any other information that one of skill in the art in possession of the present disclosure would recognize may be synchronized between aggregated networking devices included in an aggregated networking device domain.

Figure 5B:
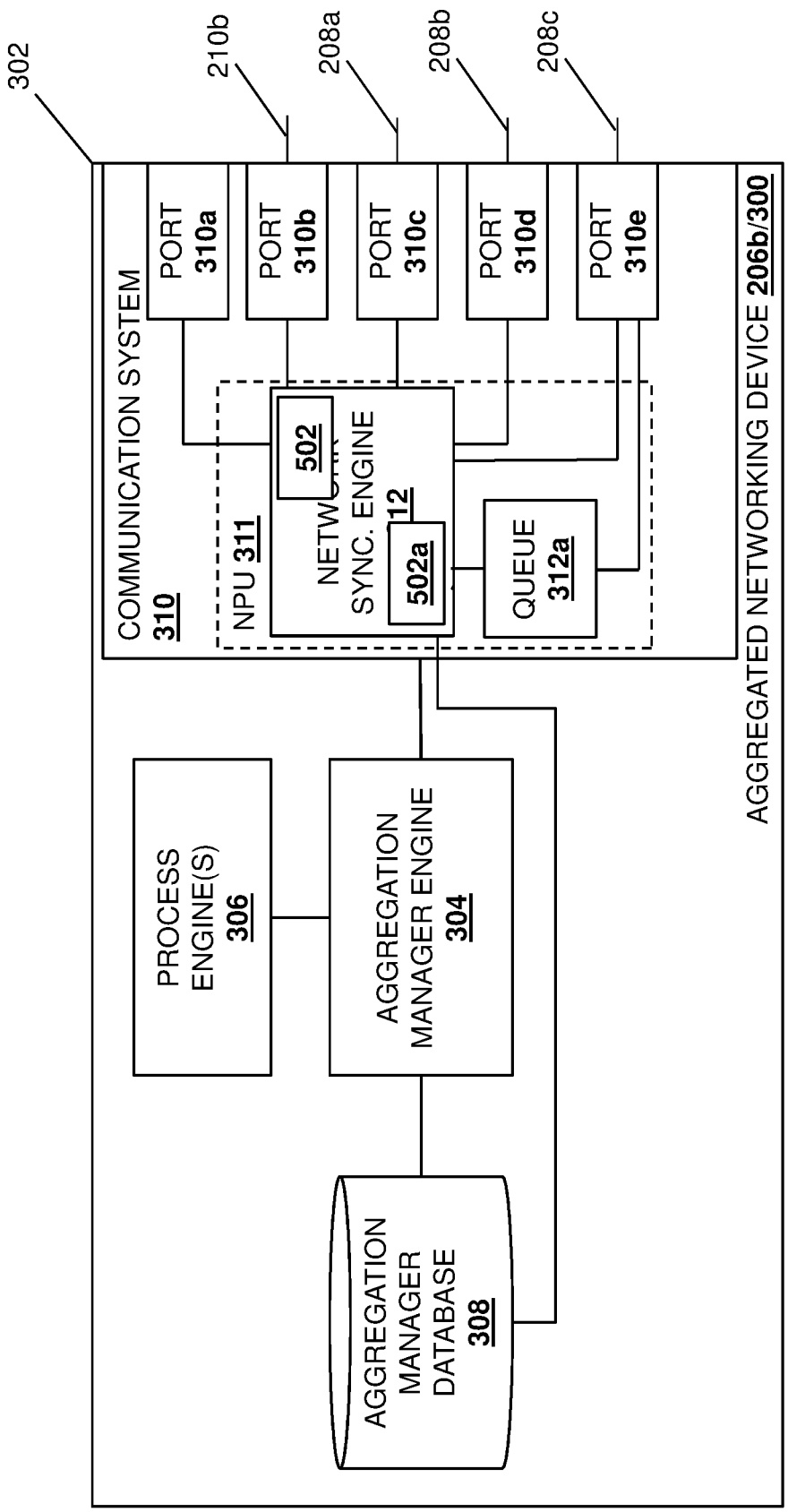
FIG. 5B is a schematic view illustrating an embodiment of the networking aggregation synchronization system of FIG. 2 operating during the method of FIG. 4.
Figure 5C:
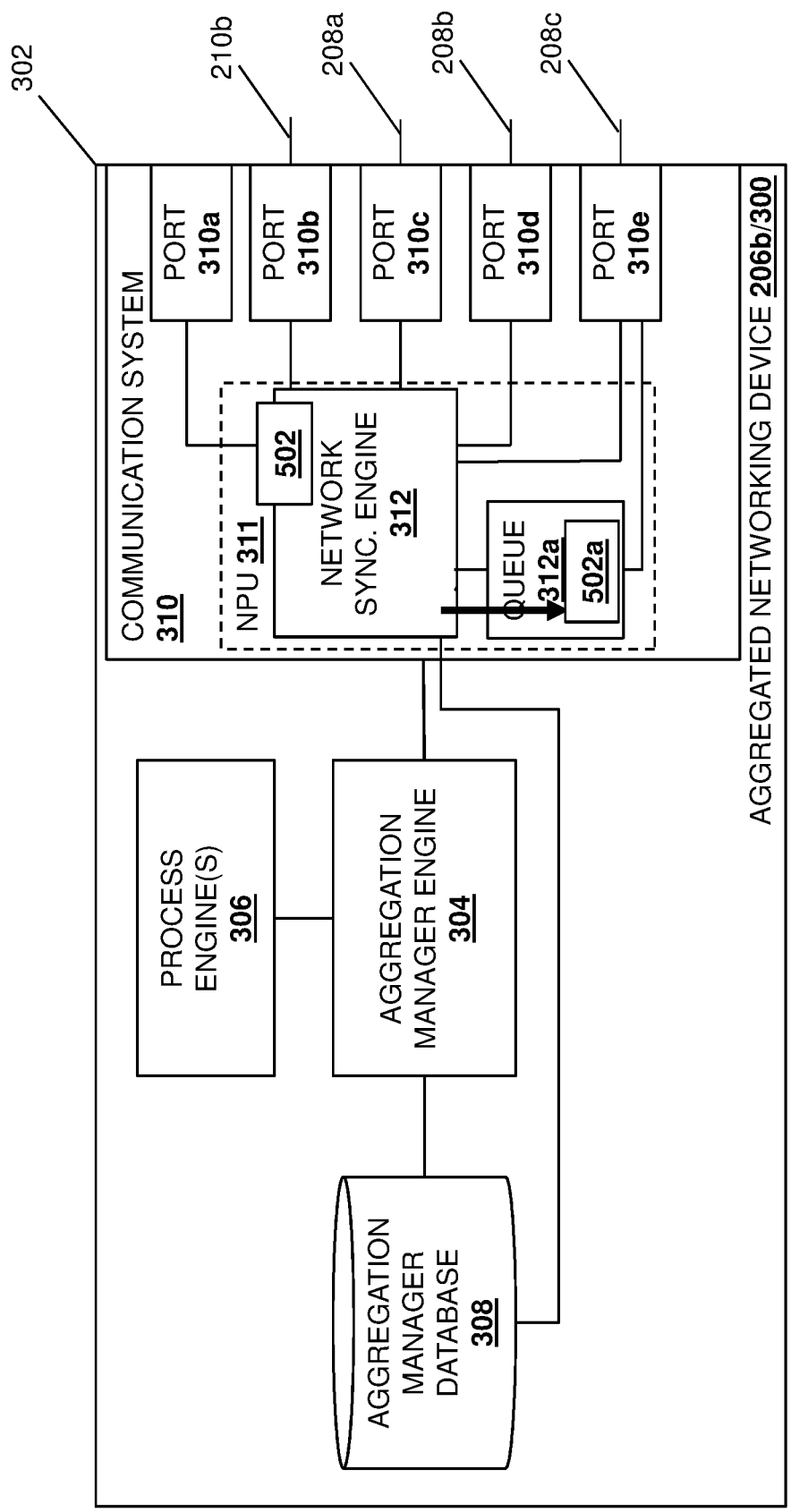
FIG. 5C is a schematic view illustrating an embodiment of the networking aggregation synchronization system of FIG. 2 operating during the method of FIG. 4.

The method 400 then proceeds to block 404 where the first aggregated networking device copies the first packet in network hardware to provide a first copied packet. In an embodiment, at block 404, the network synchronization engine 312 provided by the network processing system (e.g., the NPU 311) included in the aggregated networking device 206b/300 may copy the packet 502 to provide a copied packet 502a, as illustrated in FIG. 5B. The network synchronization engine 312 may then provide the copied packet 502a to the queue 312a that is coupled to the port 310e that provides the inter-networking-device link 208c of the ICL 208, as illustrated in FIG. 5C. One of skill in the art in possession of the present disclosure will recognize that, by copying the packet in the network hardware to a different port, the overhead associated with the use of the central processing system to complete synchronization is eliminated. For example, a remote central processing unit (CPU) feature (e.g., Remote CPU in NPUs) provided by the network synchronization engine 312 may be enabled at a CPU Class of Service Queue (CoSQ) level, and at least one of the ports 310c, 310d, and/or 310e may be set as a remote CPU port. In the examples, illustrated in FIGS. 5A-5F, the port 310e is designated as the remote CPU port, although the use of other ports to provide similar functionality will fall within the scope of the present disclosure as well. When set as the remote CPU port, the port 310e may be configured to forward normal ICL traffic, as well as the packets that are to be redirected to the central processing system in the peer aggregated networking device (e.g., the aggregated networking device 206a).

Furthermore, one or more sets of access control list (ACL) rules may be configured in an ACL stored in the aggregation manager database 308. In an embodiment, a set of ACL rules may be created for each protocol requiring synchronization associated with that protocol's aggregated networking device process. For example, the set of ACL rules may include a first rule for the network synchronization engine 312 to provide the packet 502 to the central processing system of the aggregated networking device 206b/300 to update processes on the aggregated networking device 206b/300, may include a second rule for the network synchronization engine 312 to copy the packet 502 to the central processing system of the aggregated networking device 206a/300, and/or may include other ACL rules that one of skill in the art in possession of the present disclosure would recognize as providing the functionality discussed below.

In a specific example, the packet 502 may be L2 data traffic that requires a source MAC learn. As would be recognized by one of skill in the art in possession of the present disclosure, in conventional aggregated networking devices utilizing the DELL® OS10 discussed above, the DELL® OS10 may include one ACL rule to provide the L2 packets to the aggregation manager engine 304 provided by the central processing system. However, in the DELL® OS10 provided according to the present disclosure, the ACL may include a set of ACL rules for the L2 data traffic. For example, using the DELL® OS10 provided according to the present disclosure, the aggregation manager engine 304 included on the aggregated networking device 206b/300 may learn the source MAC from the packet 502 based on the set of ACL rules for L2 data traffic, while the process engine(s) 306 may add the MAC to the MAC table stored in the aggregation manager database 308. The network synchronization engine 312 may also determine, based on the set of ACL rules and/or any other hardware table coupled to the NPU 311, that the aggregated networking device 206a/300 requires that the source MAC be learnt. Specifically, the ACL may include a first ACL rule that includes an inport member as an orphan port with a COPYTOCPU function (e.g., a local CPU option), a second ACL rule that includes an inport member as a VLT port-channel port with a COPY-TOCPU function (e.g., a remote CPU option), and/or other ACL rules that one of skill in the art in possession of the present disclosure would recognize as providing the functionality discussed below. Furthermore, similar sets of ACL rules may be created for other protocols that require synchronization or that require processing by the primary VLT peer device (e.g., IGMP).

In response to determining that the aggregated networking device 206a requires that the source MAC be learnt, the network synchronization engine 312 may copy the packet 502 to produce the copied packet 502a, and may then redirect the copied packet 502a to the aggregated networking device 206a via the port 310e designated as the remote CPU port using the second ACL rule. In an embodiment, when providing the copied packet 502a to the remote CPU port, the network synchronization engine 312 may be configured to send the copied packet 502a to a currently unused queue included in the queue(s) 312a to ensure that the copied packet 502a does not affect any other control packets provided on the ICL 208. In various embodiments, the copied packet 502a in that queue included in the queue(s) 312a must egress through the port 310e designated as the remote CPU port.

In various embodiments, before the copied packet 502a is provided to the inter-networking-device link 208c, the network synchronization engine 312 may modify a header on the copied packet to provide a modified header. For example, a HiGig header included in the copied packet 502a may be appended to provide a remote CPU header in the copied packet 502a before the copied packet 502a is sent on the port 310e via the queue 312a. Specifically, the appending to provide the remote CPU header may include encapsulating the header with a CPU Management Interface Controller (CMIC) header and/or other headers that would be apparent to one of skill in the art in possession of the present disclosure. A CMIC interface included in the network synchronization engine 312 may know where to send the copied packet based on a destination that the CMIC interface may add to the header. In an embodiment, the modified header (e.g., the remote CPU header) may include information to derive the original incoming port information for the packet (e.g., a VLAN identifier, source port identifier identifying the port from which the packet 502 originated, and/or any other information that would be apparent to one of skill in the art in possession of the present disclosure). This information may be different on each packet and each port.

Figure 5D:
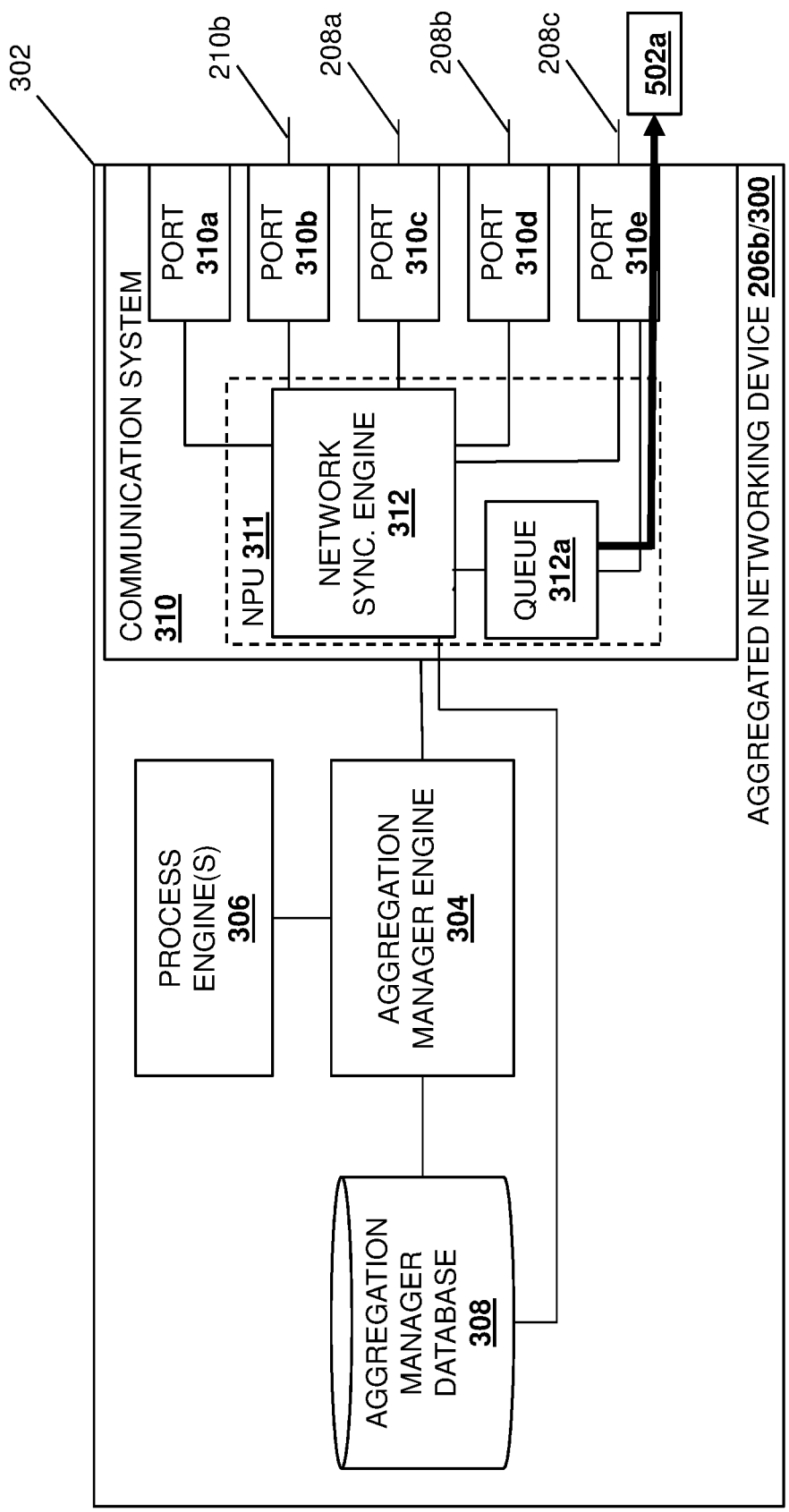
FIG. 5D is a schematic view illustrating an embodiment of the networking aggregation synchronization system of FIG. 2 operating during the method of FIG. 4.

The method 400 then proceeds to block 406 where the first aggregated networking device provides the first copied packet to the second aggregated networking device via the inter-aggregated-networking-device link. In an embodiment, at block 406 and as illustrated in FIG. 5D, the communication system 310 may provide the copied packet 502a to the aggregated networking device 206a via the queue 312a, the port 310e that is designated as the remote central processing system port, and the inter-networking-device link 208c that is included in the ICL 208.

Figure 5E:
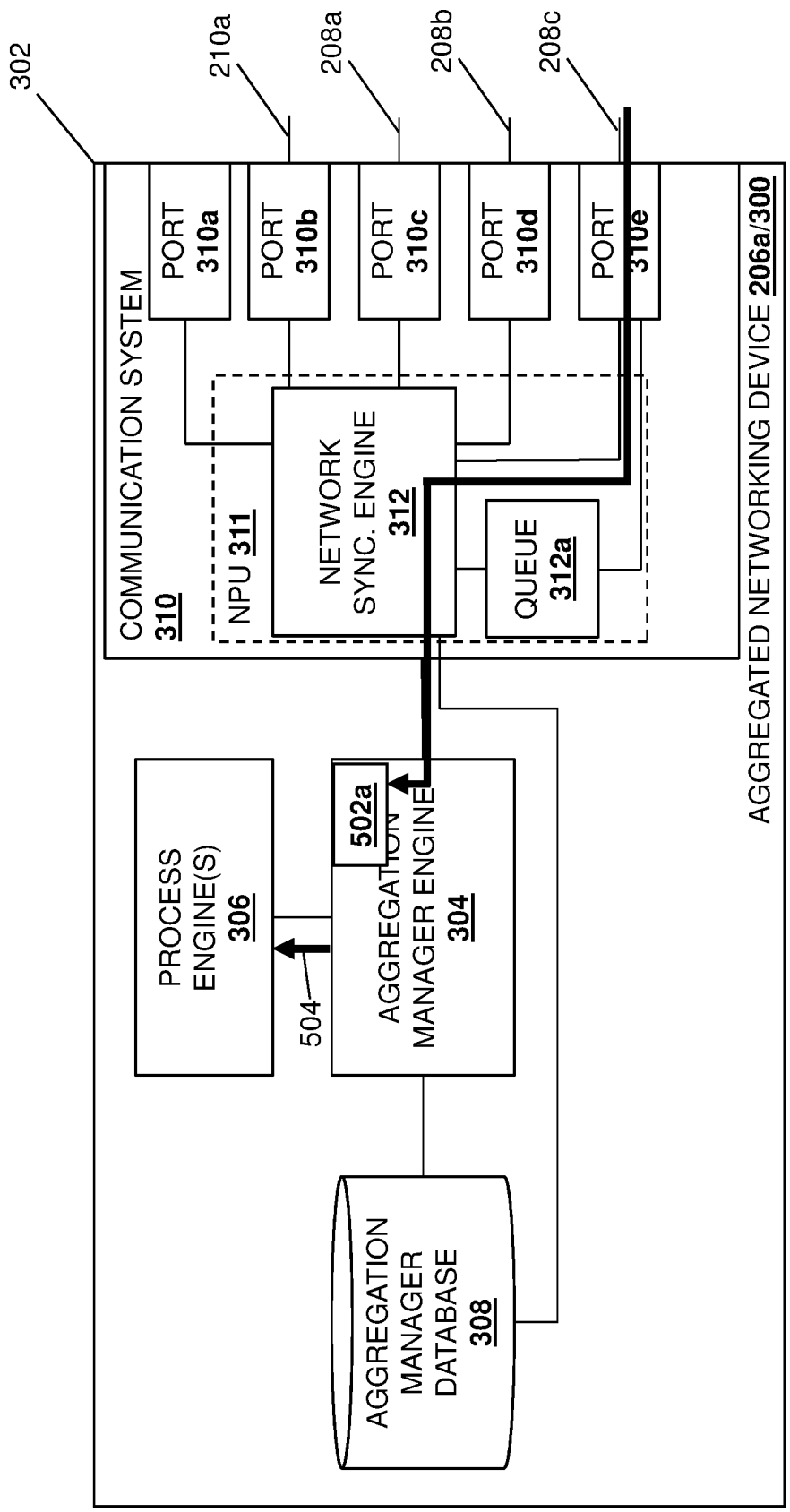
FIG. 5E is a schematic view illustrating an embodiment of the networking aggregation synchronization system of FIG. 2 operating during the method of FIG. 4.

The method 400 then proceeds to block 408 where the second aggregated networking device receives the first copied packet via the inter-aggregated-networking-device link using a second network processing system included in the second aggregated networking device. In an embodiment, at block 408 and as illustrated in FIG. 5E, the aggregated networking device 206a/300 receives the copied packet 502a transmitted from the aggregated networking device 206b. In one example, the remote CPU feature provided by the network synchronization engine 312 included on the aggregated networking device 206b/300 may perform a CMIC operation that provides the copied packet 502a to the central processing system that provides the aggregation manager engine 304 and the process engine(s) 306 on the aggregated networking device 206a/300. As illustrated in FIG. 5E, the copied packet 502a may be provided via the port 310e to the central processing system in the aggregated networking device 206a/300. The aggregation manager engine 304 in the aggregated networking device 206a/300 may then determine, from the copied packet 502a, the information for synchronizing at least one first aggregated networking device process provided by the process engine(s) 306 that run in the aggregated networking device 206b with respective corresponding aggregated networking device processes provided by the process engine(s) 306 that run in the aggregated networking device 206a/300. For example, the aggregation manager engine 304 included in the aggregated networking device 206a/300 may obtain the header information stored in the CMIC header.

While embodiments herein describe the copied packet 502a being provided directly to the central processing system that provides the aggregation manager engine 304 and the process engine(s) 306 on the aggregated networking device 206a/300 (e.g., via a CMIC operation), in some embodiments the packet 502 may be provided directly to the central processing system that provides the aggregation manager engine 304 and the process engine(s) 306 on the aggregated networking device 206a/300. The packet 502 will not reach the central processing system on the aggregated networking device 206b/300 on which the packet was first received. The network synchronization engine 312 will check the content of the packet 502 and decide whether it is for the local central processing system or the remote processing system and send the packet 502 to the appropriate central processing system.

The method 400 then proceeds to block 410 where the second aggregated networking device synchronizes the respective corresponding second aggregated networking device processes with the at least one first aggregated networking device process running in the first aggregated networking device using the second central processing system and the first information included in the copied packet. In an embodiment, at block 410 and with reference to FIGS. 5E and 5F, the aggregation manager engine 304 in the aggregated networking device 206a/300 may operate to cause the synchronization of processes provided by the process engine(s) 306 and running on the aggregated networking device 206a/300 with corresponding, respective processes provided by the process engine(s) 306 and running on the aggregated networking device 206b. For example, as illustrated in FIG. 5E, the aggregation manager engine 304 in the aggregated networking device 206a/300 may generate and transmit a synchronization initiation message 504 to the process engine(s) 306 that is configured to cause those process engine(s) 306 to initiate the synchronization of the processes that they provide with corresponding, respective processes running on the aggregated networking device 206b. As such, the synchronization initiation message 504 may include the information that is retrieved from the copied packet 502a and used for synchronization.

In a specific example, the process engine(s) 306 in the aggregated networking device 206a/300 include a Media Access Control (MAC) address manager engine, an Address Resolution Protocol (ARP) manager engine, a multicast routing protocol engine, aggregation Spanning Tree Protocol (xSTP) engine, an Internet Group Management Protocol (IGMP) snooping engine and up to an Dynamic Host Configuration Protocol (DHCP) snooping engine, as well as any other process engine that would be apparent to one of skill in the art in possession of the present disclosure) while remaining within the scope of the present disclosure as well. As will also be appreciated by one of skill in the art in possession of the present disclosure, the MAC address manager engines in the aggregated networking devices 206a and 206b, respectively, may operate to provide corresponding respective MAC address manager processes that run on each of the aggregated networking devices 206a and 206b and that may operate to perform a variety of MAC address manager process operations known in the art. For example, in some embodiments, information (e.g., a source MAC address) included in the copied packet 502 and provided to the MAC address manager via the synchronization initiation message 504 may result in the programming of MAC addresses in the aggregated networking device 206a for the purposes of subsequent data packet forwarding of data packets associated with the same MAC address.

Figure 5F:
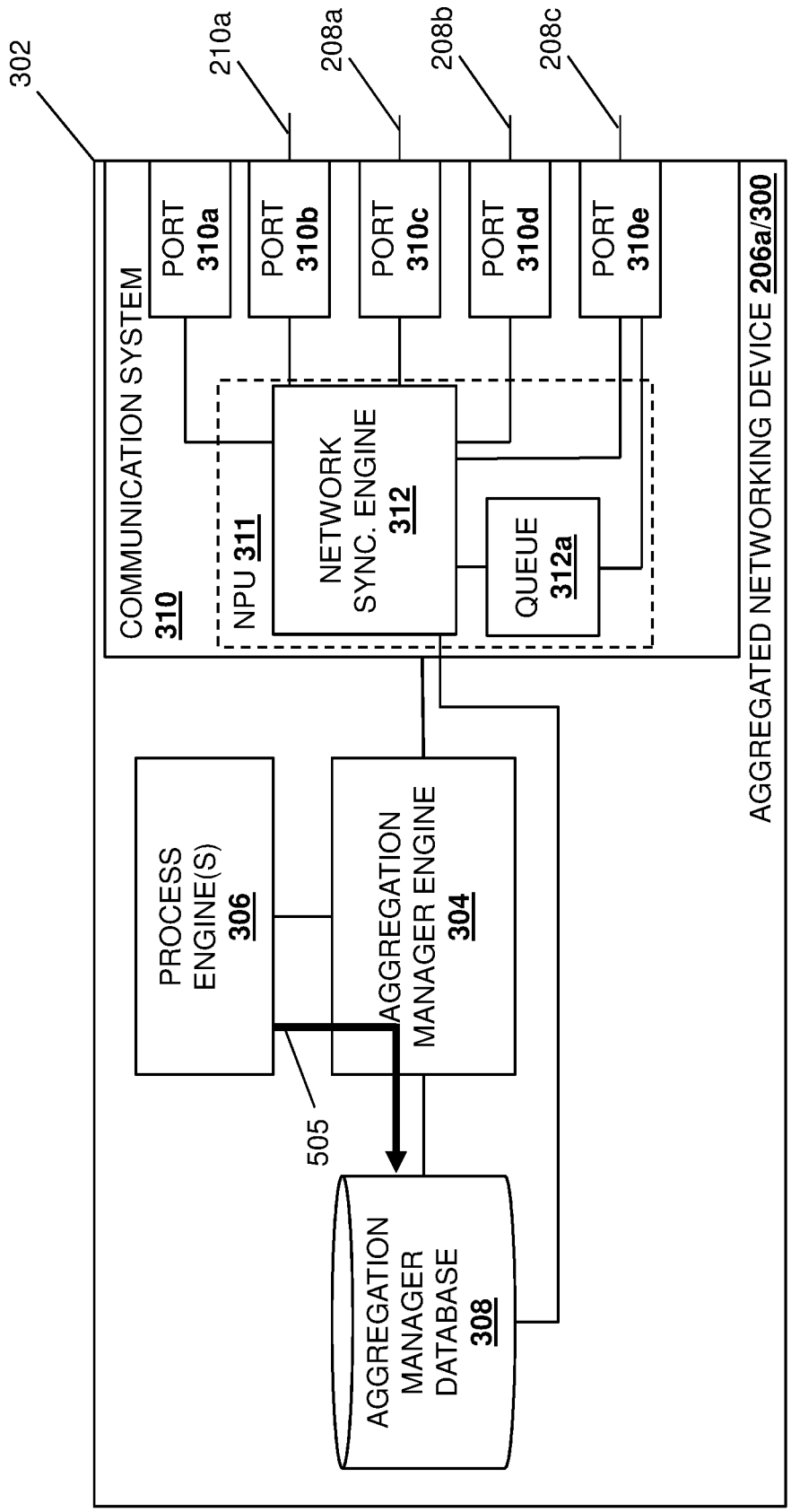
FIG. 5F is a schematic view illustrating an embodiment of the networking aggregation synchronization system of FIG. 2 operating during the method of FIG. 4.

As illustrated in FIG. 5F, each of the process engine(s) 306 on the aggregated networking device 206a may synchronize with their respective process engine 306 on the aggregated networking device 206a/300 by updating various tables in the aggregation manager database 308. For example, the MAC address manager process running on the aggregated networking devices 206a may operate to perform MAC address manager process operations that include programming any received MAC addresses in the MAC table stored in the aggregation manager database 308, as indicated by the arrow 505 in FIG. 5F.

Figure 5G:
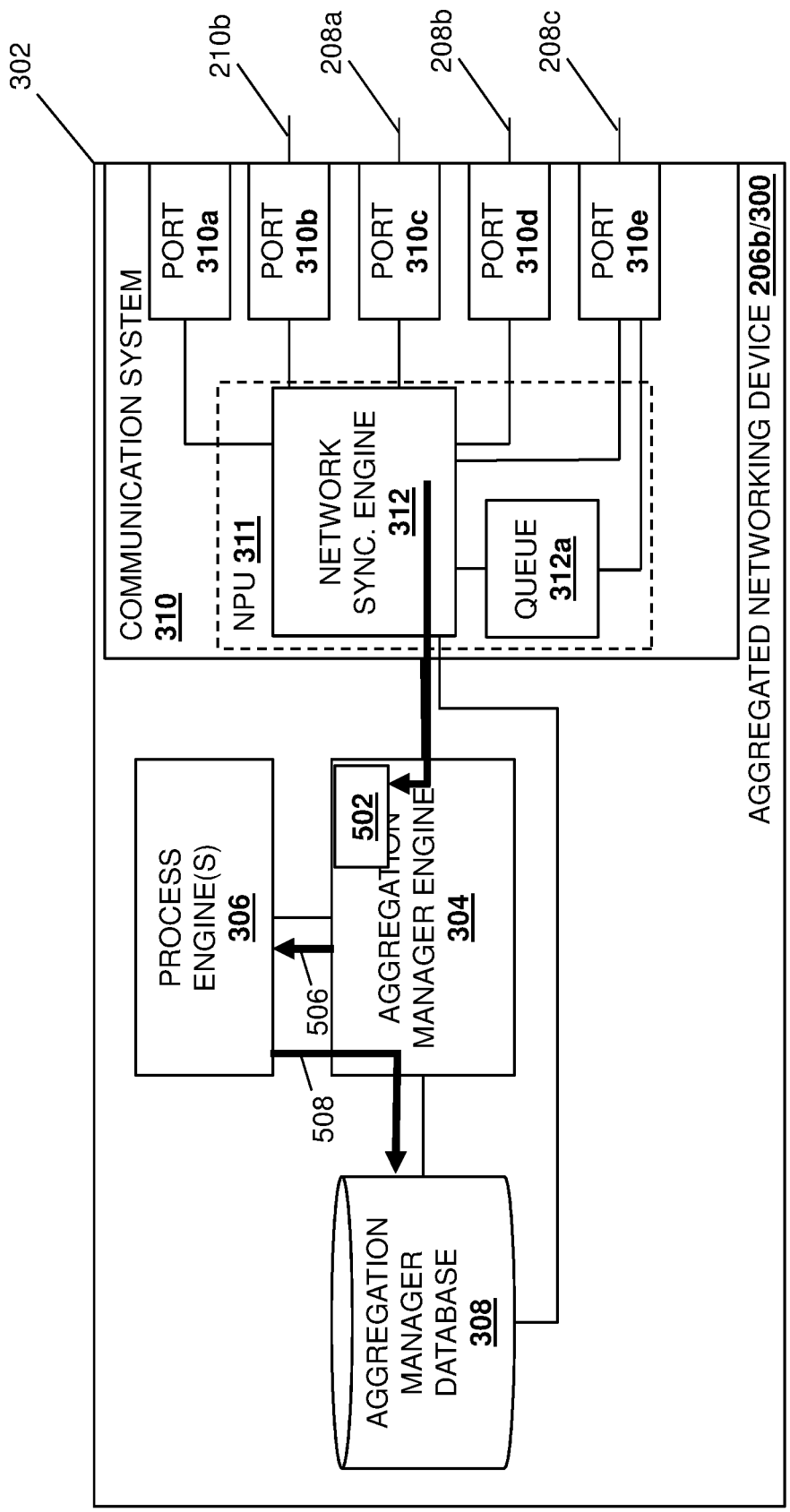
FIG. 5G is a schematic view illustrating an embodiment of the networking aggregation synchronization system of FIG. 2 operating during the method of FIG. 4.

In an embodiment, at block 410 and with reference to FIG. 5G, the aggregation manager engine 304 in the aggregated networking device 206b/300 may operate to cause the synchronization of processes provided by the process engine(s) 306 and running on the aggregated networking device 206b/300 with corresponding, respective processes provided by the process engine(s) 306 and running on the aggregated networking device 206a. For example, as illustrated in FIG. 5G, the aggregation manager engine 304 in the aggregated networking device 206b may generate and transmit a synchronization initiation message 506 to the process engine(s) 306 that are configured to cause those process engine(s) 306 to initiate the synchronization of the processes that they provide with corresponding respective processes running on the aggregated networking device 206a. As such, the synchronization initiation message 506 may include the information that retrieved from the original packet 502 and used for synchronization.

As illustrated in FIG. 5G, each of the process engine(s) 306 on the aggregated networking device 206b/300 may then synchronize with their respective process engine 306 on the aggregated networking device 206b/300 by updating their respective tables in the aggregation manager database 308. For example, the MAC address manager process running on the aggregated networking devices 206b/300 may operate to perform MAC address manager process operations that include programming any received MAC addresses in the MAC table stored in the aggregation manager database 308, as indicated by the arrow 508. While a specific MAC address manager process operation performed by the MAC address manager processes running on each of the aggregated networking devices 206a and 206b has been described, one of skill in the art in possession of the present disclosure will recognize that a variety of other MAC address manager process operations will fall within the scope of the present disclosure as well. Furthermore, one of skill in the art in possession of the present disclosure will recognize that the Address Resolution Protocol (ARP) manager engine, the multicast routing protocol engine, aggregation Spanning Tree Protocol (xSTP) engine, the Internet Group Management Protocol (IGMP) snooping engine, and/or up to the Dynamic Host Configuration Protocol (DHCP) snooping engine on each aggregated networking device 206a and 206b may perform their conventional local updating based on the synchronization initiation message 504 and 506 as well.

In various embodiments of method 400, the synchronization of peer aggregated networking devices 206a and 206b included in the networking aggregation synchronization system 200 may be configured to handle an event such the ICL 208 going down or otherwise becoming unavailable in a manner that is similar to when an ICL goes down or otherwise becomes unavailable in conventional systems. For example, in the event that the ICL 208 goes down or otherwise becomes unavailable, the remote CPU port (e.g., the port 310e) may goes down or otherwise become unavailable as well. In this scenario, the copied packet 502a cannot be transferred from the aggregated networking device 206b to the aggregated networking device 206a, and thus the synchronization of processes discussed above cannot be completed, which is similar to what occurs in conventional process synchronization when an ICL between peer aggregated networking devices goes down or otherwise becomes unavailable. Furthermore, while the method 400 is described from the point of view of the aggregated networking device 206b receiving the packet 502 and providing the copied packet 502a to the aggregated networking device 206a, one of skill in the art in possession of the present disclosure will recognize that the aggregated networking device 206a may receive a packet with information that requires synchronization with the aggregated networking device 206b, copy that packet, and provide a copy of that packet to the aggregated networking device 206b according to the method 400 discussed above.

Thus, systems and methods have been described that provide for the synchronization of processes running in VLT peer devices that provide an VLT domain. For example, a VLT domain may include a secondary VLT peer device that is configured to provide a first portion of a VLT LAG to a TOR switch device, and a primary VLT peer device that is coupled to the secondary VLT peer device and that is configured to provide a second portion of the VLT LAG to the TOR switch device. The secondary VLT peer device may establish an ICL/VLTi with the primary VLT peer device, and may receive a first packet via a VLT LAG port that is included in the secondary VLT peer device and that provides the first portion of the VLT LAG to the TOR switch device. The first packet may include first information for synchronizing at least one process running in the secondary VLT peer device with respective corresponding processes running in the primary VLT peer device, and an NPU included in the secondary VLT peer device may copy the packet and provide the copied packet to the primary VLT peer device via the ICL/VLTi.

The primary VLT peer device may receive the first copied packet via a designated link on the ICL/VLTi, and then use a CPU included in the primary VLT peer device and the information included in the first copied packet to synchronize the respective corresponding primary VLT peer device processes with the at least one secondary VLT peer device process running in the secondary VLT peer device. As such, the secondary VLT peer device can copy the packet in its network hardware (e.g., the NPU) without having to process the packet for synchronization at an application level with its CPU. As will be appreciated by one of skill in the art in possession of the present disclosure, bypassing the CPU reduces the number of processes and workloads running on the secondary VLT peer device, and providing a copied packet directly from network hardware without the use of the CPU speeds up the synchronization process by providing the copied packet directly from the network hardware in the secondary VLT peer device to the primary VLT peer device instead of using the CPU to provide the packet back through the network hardware to the primary VLT peer device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networking aggregation synchronization system, comprising:
    a second aggregated networking device that is configured to provide a second portion of a link aggregation to a connected device; and
    a first aggregated networking device that is coupled to the second aggregated networking device via an inter-aggregated-networking-device link and that is configured to provide a first portion of the link aggregation to the connected device, wherein the first aggregated networking device is configured to:
        receive a first packet via a first aggregated port that is included in the first aggregated networking device and that provides the first portion of the link aggregation to the connected device, wherein the first packet includes first synchronization information for synchronizing at least one of a Address Resolution Protocol (ARP) manager process, a multicast routing protocol process, an aggregation Spanning Tree Protocol (STP) process, an Internet Group Management Protocol (IGMP) snooping process, and a Dynamic Host Configuration Protocol (DHCP) process running in each of the first aggregated networking device and the second aggregated networking device;
        copy, based on at least one first Access Control List (ACL) entry using a first Network Processing Unit (NPU) that is included in the first aggregated networking device and that is configured to also perform data path determination and data path forwarding, the first packet to provide a first copied packet; and
        provide, based on the at least one first ACL entry using a first remote CPU feature provided by the first NPU, the first copied packet to the second aggregated networking device via a first remote CPU port included in the inter-aggregated-networking-device link, wherein the second aggregated networking device is configured to:
            receive, via the inter-aggregated-networking-device link using a second NPU included in the second aggregated networking device, the first copied packet; and
            synchronize, using a second CPU included in the second aggregated networking device and the first synchronization information included in the first copied packet, the respective corresponding second aggregated networking device processes with the at least one first aggregated networking device process running in the first aggregated networking device.

2. The system of claim 1, wherein the second aggregated networking device is configured to:
    receive a second packet on a second aggregated port that provides the first portion of the link aggregation to the connected device, wherein the second packet includes second synchronization information for synchronizing the at least one of the ARP management process, the multicast routing protocol process, the aggregation STP process, the IGMP snooping process, and the DHCP process running in each of the first aggregated networking device and the second aggregated networking device;
    copy, based on at least one second ACL entry using the second NPU, the second packet to provide a second copied packet; and
    provide, based on at least one second ACL entry using a second remote CPU feature provided by the second NPU, the second copied packet to the first aggregated networking device via a second remote CPU port included in the inter-aggregated-networking-device link, wherein the first aggregated networking device is configured to:
        receive, via the inter-aggregated-networking-device link using the first NPU, the second copied packet; and
        synchronize, using a first CPU included in the first aggregated networking device and the second synchronization information included in the second copied packet, the at least one first aggregated networking device process with the respective corresponding second aggregated networking device processes.

3. The system of claim 1, wherein the first aggregated networking device is configured to:
    provide the first packet to a first CPU included in the first aggregated networking device; and
    update, using the first CPU, the at least one first aggregated networking device process.

4. The system of claim 1, wherein the providing the first copied packet to the second aggregated networking device via the first remote CPU port included in the inter-aggregated-networking-device link includes:
    providing, using the first network processing system, the first copied packet to a first queue that is coupled to the first remote CPU port included in the inter-aggregated-networking-device link; and
    outputting, via the first queue and the first remote CPU port, the first copied packet to the inter-aggregated-networking-device link.

5. The system of claim 1, wherein the first remote CPU feature is enabled at a first CPU Class of Service Queue (CoSQ) level.

6. The system of claim 1, wherein the at least one first aggregated networking device process includes at least one of a Media Access Control (MAC) address process, an Address Resolution Protocol (ARP) process, and a multicast routing process.

7. The system of claim 1, wherein the second aggregated networking device is designated as a primary aggregated networking device, and wherein the first aggregated networking device is designated as a secondary aggregated networking device.

8. An Information Handling System (IHS), comprising:
a Central Processing Unit (CPU);
a Network Processing Unit (NPU) that is configured to perform data path determination and data path forwarding; and
a memory system that is coupled to the NPU and the CPU and that includes instructions that, when executed by the NPU, cause the NPU to provide a network synchronization engine that is configured to:
receive a first packet on a first aggregated port that provides a first portion of a link aggregation to a connected device, wherein the first packet includes first synchronization information for synchronizing at least one of a Address Resolution Protocol (ARP) manager process, a multicast routing protocol process, an aggregation Spanning Tree Protocol (STP) process, an Internet Group Management Protocol (IGMP) snooping process, and a Dynamic Host Configuration Protocol (DHCP) process running in each of the IHS and a first aggregated networking device that is coupled to the NPU via an inter-aggregated-networking-device link;
copy, based on at least one first Access Control List (ACL) entry, the first packet to provide a first copied packet; and
provide, based on at least one first ACL entry using a remote CPU feature provided by the NPU, the first copied packet to the first aggregated networking device via a first remote CPU port included in the inter-aggregated-networking-device link without processing the first copied packet using the CPU.

9. The IHS of claim 8, wherein the network synchronization engine is configured to:
receive, via the inter-aggregated-networking-device link from the first aggregated networking device, a second copied packet and wherein the CPU is configured to:
synchronize, using the second synchronization information included in the second copied packet, the at least one of the ARP management process, the multicast routing protocol process, the aggregation STP process, the IGMP snooping process, and the DHCP process running in each of the IHS and the first aggregated networking device.

10. The IHS of claim 8, wherein the network synchronization engine is configured to:
provide the first packet to the CPU, and wherein the CPU is configured to:
update the at least one first aggregated networking device process.

11. The IHS of claim 8, wherein the providing the first copied packet to the first aggregated networking device via the first remote CPU port included in the inter-aggregated-networking-device link includes:
providing the first copied packet to a first queue that is coupled to the first remote CPU port included in the inter-aggregated-networking-device link; and
outputting, via the first queue and the first remote CPU port, the first copied packet to the inter-aggregated-networking-device link.

12. The IHS of claim 8, wherein the first remote CPU feature is enabled at a first CPU Class of Service Queue (CoSQ) level.

13. The IHS of claim 8, wherein the at least one first aggregated networking device process includes at least one of a Media Access Control (MAC) address process, an Address Resolution Protocol (ARP) process, and a multicast routing process.

14. A method of synchronizing aggregated networking devices, comprising:
receiving, by a first Network Processing Unit (NPU) included in a first aggregated networking device, a first packet on a first aggregated port that provides a first portion of a link aggregation to a connected device, wherein the first packet includes first synchronization information for synchronizing at least one of a Address Resolution Protocol (ARP) manager process, a multicast routing protocol process, an aggregation Spanning Tree Protocol (STP) process, an Internet Group Management Protocol (IGMP) snooping process, and a Dynamic Host Configuration Protocol (DHCP) process running in each of the first aggregated networking device and a second aggregated networking device that is coupled to the first aggregated networking device via an inter-aggregated-networking-device link;
copying, by the first NPU based on at least one first Access Control List (ACL) entry, the first packet to provide a first copied packet; and
providing, by the first NPU based on at least one first ACL entry using a remote CPU feature provided by the NPU, the first copied packet to the second aggregated networking device via a first remote CPU port included in the inter-aggregated-networking-device link without processing the first copied packet using a first Central Processing Unit (CPU) included in the first aggregated networking device.

15. The method of claim 14, further comprising:
receiving, by the first aggregated networking device via the inter-aggregated-networking-device link from the second aggregated networking device, a second copied packet; and
synchronizing, by the first aggregated networking device using the first CPU and second synchronization information included in the second copied packet, the at least one of the ARP management process, the multicast routing protocol process, the aggregation STP process, the IGMP snooping process, and the DHCP process running in each of the first aggregated networking device and the second aggregated networking device.

16. The method of claim 14, further comprising:
providing, by the first network processing system, the first packet to the first CPU; and
updating, using the first CPU, the at least one first aggregated networking device process.

17. The method of claim 14, wherein the providing the first copied packet to the second aggregated networking device via the first remote CPU port included in the inter-aggregated-networking-device link includes:
providing, using the first NPU, the first copied packet to a first queue that is coupled to the first remote CPU port included in the inter-aggregated-networking-device link; and
outputting, via the first queue and the first inter remote CPU port, the first copied packet to the inter-aggregated-networking-device link.

18. The method of claim 14, wherein the first remote CPU feature is enabled at a first CPU Class of Service Queue (CoSQ) level.

19. The method of claim 14, wherein the at least one first aggregated networking device process includes at least one of a Media Access Control (MAC) address process, an Address Resolution Protocol (ARP) process, and a multicast routing process.

20. The method of claim 14, wherein the second aggregated networking device is designated as a primary aggregated networking device, and wherein the first aggregated networking device is designated as a secondary aggregated networking device.

\* \* \* \* \*